(12) United States Patent
Kim

(10) Patent No.: US 9,347,645 B2
(45) Date of Patent: May 24, 2016

(54) ILLUMINATION UNIT AND DISPLAY APPARATUS USING THE SAME

(71) Applicant: LG INNOTEK CO., LTD., Seoul (KR)

(72) Inventor: Moon Jeong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/557,219

(22) Filed: Dec. 1, 2014

(65) Prior Publication Data

US 2015/0085484 A1 Mar. 26, 2015

Related U.S. Application Data

(63) Continuation of application No. 13/711,222, filed on Dec. 11, 2012, now Pat. No. 8,919,990.

(30) Foreign Application Priority Data

Dec. 12, 2011 (KR) ........................ 10-2011-0132885

(51) Int. Cl.
| | |
|---|---|
| *F21V 11/00* | (2015.01) |
| *F21V 7/09* | (2006.01) |
| *F21V 7/00* | (2006.01) |
| *G09F 13/14* | (2006.01) |
| *G09F 13/18* | (2006.01) |
| *G09F 13/22* | (2006.01) |
| *F21V 8/00* | (2006.01) |
| *G09F 13/04* | (2006.01) |

(52) U.S. Cl.
CPC ... *F21V 7/09* (2013.01); *F21V 7/00* (2013.01); *G02B 6/0096* (2013.01); *G09F 13/14* (2013.01); *G09F 13/18* (2013.01); *G09F 13/22* (2013.01); *G09F 2013/049* (2013.01); *G09F 2013/0422* (2013.01); *G09F 2013/0436* (2013.01); *G09F 2013/142* (2013.01); *G09F 2013/145* (2013.01); *G09F 2013/147* (2013.01); *G09F 2013/1881* (2013.01); *G09F 2013/222* (2013.01)

(58) Field of Classification Search
CPC ..................... G02B 6/0096; G09F 2013/1881; G09F 2013/049; G09F 2013/0436; G09F 2013/0422
USPC .......................... 362/235, 241, 243, 247, 297
See application file for complete search history.

(56) References Cited

U.S. PATENT DOCUMENTS

| | | | | |
|---|---|---|---|---|
| 5,863,114 | A * | 1/1999 | Nagatani et al. | ............... 362/328 |
| 8,469,575 | B2 * | 6/2013 | Weber et al. | ................... 362/609 |

(Continued)

FOREIGN PATENT DOCUMENTS

| | | |
|---|---|---|
| CN | 101495801 A | 7/2009 |
| CN | 201448639 U | 5/2010 |

(Continued)

*Primary Examiner* — Vip Patel

(74) *Attorney, Agent, or Firm* — Birch, Stewart, Kolasch & Birch, LLP

(57) ABSTRACT

An illumination unit, can include first and second reflectors, and at least one light source module disposed between the first and second reflectors, wherein the second reflector includes at least one inclined surface including at least one inflection point, and at least one first flat surface disposed close to the at least one light source module and being parallel to the first reflector.

20 Claims, 23 Drawing Sheets

(56) References Cited

U.S. PATENT DOCUMENTS

2003/0117544 A1    6/2003    Kim et al.
2005/0042913 A1    2/2005    Yu et al.
2007/0070623 A1    3/2007    Laski
2011/0211335 A1    9/2011    Ko
2011/0222267 A1    9/2011    Park et al.

FOREIGN PATENT DOCUMENTS

| | | |
|---|---|---|
| CN | 101740670 A | 6/2010 |
| JP | 2-32320 A | 2/1990 |
| JP | 2004-288498 A | 10/2004 |
| JP | 2011-065971 A | 3/2011 |

* cited by examiner

ILLUMINATION UNIT AND DISPLAY APPARATUS USING THE SAME

CROSS REFERENCE TO RELATED APPLICATION

This application is a continuation of co-pending U.S. patent application Ser. No. 13/711,222 filed on Dec. 11, 2012, which claims priority under 35 U.S.C. §119 to Korean Patent Application No. 10-2011-0132885, filed in Korea on 12 Dec. 2011, which are hereby incorporated in their entirety by reference as if fully set forth herein.

BACKGROUND OF THE INVENTION

1. Technical Field

Embodiments relate to an illumination unit and a display apparatus using the same.

2. Background Art

In general, downlights are constructed such that a light source is embedded in a ceiling hole. Such downlights have been widely used as architectural illumination means that integrate illumination with a building.

The downlight is embedded in the ceiling so as to be substantially prevented from being exposed outward, thus advantageously providing an orderly external appearance to the ceiling. Moreover, the downlight embedded in the ceiling may have low luminance and be suitable to form an intimate indoor space.

However, such an illumination unit configuration may be suitable for a narrow indoor space than a wide indoor space, and may need a great number of light sources such as Light Emitting Diodes (LEDs).

Accordingly, in the future, development of an illumination unit suitable for a wide indoor space even with a low number of LEDs is necessary.

SUMMARY OF THE INVENTION

Embodiments provide an illumination unit which includes a reflector partially provided with an inclined surface and is suitable for a wide indoor space, and a display apparatus using the same.

In one embodiment, an illumination unit includes first and second reflectors, and at least one light source module placed between the first and second reflectors, wherein the second reflector includes a bottom plate, first lateral plates arranged to face each other in a first direction of the bottom plate, second lateral plates arranged to face each other in a second direction orthogonal to the first direction, a groove formed in at least one of the second lateral plate and the bottom plate, and at least one hole formed in the groove.

The light source module may be placed on the first lateral plate of the second reflector, and may include at least one connector for electric connection with an external component.

In this case, the groove may be located close to the connector.

The illumination unit may further include at least one drive unit placed below the bottom plate of the second reflector and serving to drive the light source module, and at least one line placed through the groove and the hole to electrically connect the light source module and the drive unit to each other.

The groove may have a width and a depth which differ from each other, and the width of the groove may be less than the depth of the groove.

The width of the groove may differ from the width of the hole, and the width of the groove may be greater than the width of the hole.

The width of the groove may be equal to the width of the hole.

The groove may include first and second lateral surfaces facing each other, and a bottom surface located between the first and second lateral surfaces, and a first angle between the first lateral surface and the bottom surface and a second angle between the second lateral surface and the bottom surface may be an acute angle.

Here, the first angle and the second angle may differ from each other. The first angle may be a right angle and the second angle may be an acute angle. Alternatively, the first angle may be an acute angle and the second angle may be a right angle.

The first lateral surface may be a curved surface having a first radius of curvature, the second lateral surface may be a curved surface having a second radius of curvature, and the first radius of curvature and the second radius of curvature may differ from each other.

The bottom plate of the second reflector may include at least one inclined surface.

The at least one inclined surface may include at least one inflection point such that inclined surfaces, which are located next to each other about the inflection point, have different radii of curvature.

The light source module may be spaced apart from the first reflector by a first distance, and may be spaced apart from the second reflector by a second distance. The first distance and the second distance may differ from each other.

The light source module may come into contact with at least one of the first and second reflectors.

A thickness of a region of the first reflector close to the light source module may differ from a thickness of a region of the first reflector distant from the light source module, and the first reflector may include a reflective pattern formed on a surface thereof facing the light source module.

The first reflector and the second reflector may be formed of different materials.

In another embodiment, an illumination unit includes a bottom plate, first lateral plates arranged to face each other in a first direction of the bottom plate, second lateral plates arranged to face each other in a second direction orthogonal to the first direction, a groove formed in at least one of the second lateral plate and the bottom plate, and at least one hole formed in the groove, wherein the light source module including a connector is placed on the first lateral plate, and a portion of the connector overlaps with the groove of the second lateral plate.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Hereinafter, embodiments will be described with reference to the annexed drawings.

It will be understood that when an element is referred to as being 'on' or "under" another element, it can be directly on/under the element, and one or more intervening elements may also be present.

Also, when an element is referred to as being 'on' or 'under', 'under the element' as well as 'on the element' can be included based on the element.

Figure 1:
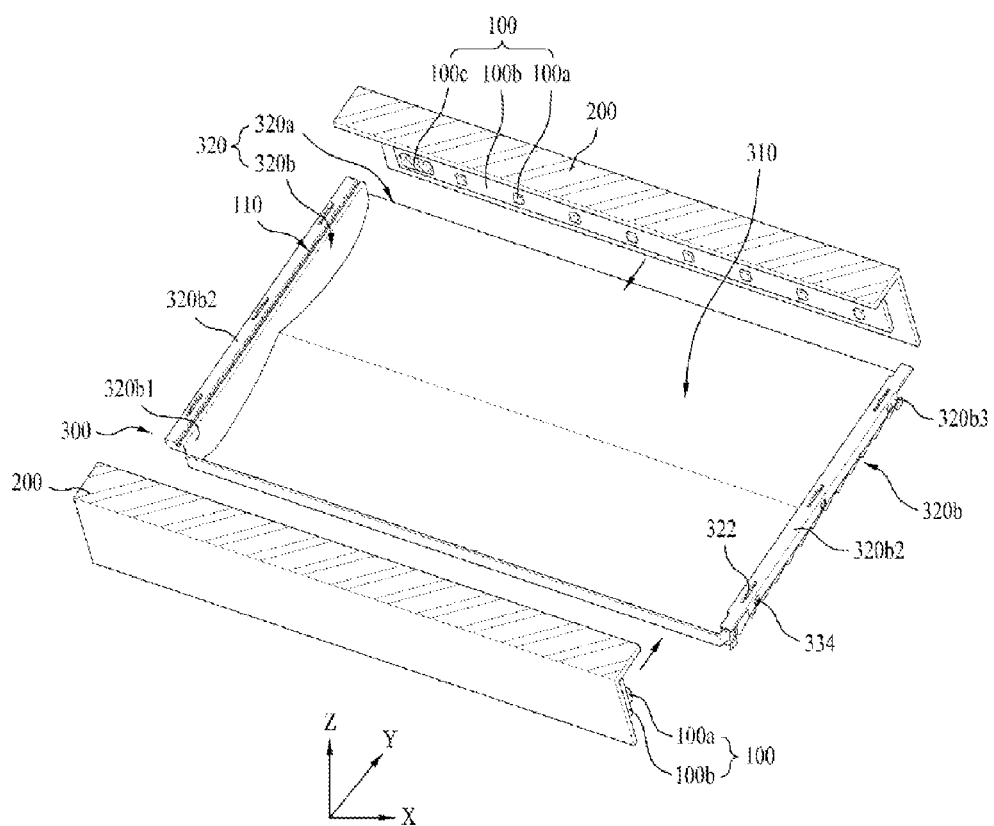
FIG. 1 is an explanatory perspective view illustrating an illumination unit according to an embodiment.

FIG. 1 is an explanatory perspective view illustrating an illumination unit according to an embodiment.

As illustrated in FIG. 1, the illumination unit may include first and second reflectors 200 and 300, and at least one light source module 100 placed between the first and second reflectors 200 and 300.

The light source module 100 may be located between the first reflector 200 and the second reflector 300 and may be located closer to the first reflector 200 than the second reflector 300.

As occasion demands, the light source module 100 may come into contact with the first reflector 200 while being spaced apart from the second reflector 300 by a predetermined distance, or may come into contact with the second reflector 300 while being spaced apart from the first reflector 200 by a predetermined distance.

Alternatively, the light source module 100 may be spaced apart from the first reflector 200 and the second reflector 300 by predetermined distances, or may come into contact with both the first reflector 200 and the second reflector 300.

The light source module 100 may include a board 100b having an electrode pattern, at least one light source 100a placed on the board 100b, and at least one connector 100c for electric connection with an external component.

The light source 100a of the light source module 100 may be a top view type light emitting diode.

As occasion demands, the light source 100a may be a side view type light emitting diode.

The board 100b may be a Printed Circuit Board (PCB) formed of any one material selected from among polyethyleneterephthalate (PET), glass, polycarbondate (PC), and silicon (Si), and may take the form of a film.

A single layer PCB, a multilayer PCB, a ceramic board, a metal core PCB, or the like may be selectively used as the board 100b.

The board 100b may be provided with any one of a reflective coating film and a reflective coating material layer, to reflect light emitted from the light source 100a to a central region of the reflector 300.

The light source 100a may be a Light Emitting Diode (LED) chip. The LED chip may be a blue LED chip or an ultraviolet LED chip, or may be a package combining at least one or more selected from among a red LED chip, a green LED chip, a blue LED chip, a yellow green LED chip, and a white LED chip.

A white LED may be realized by coupling a yellow phosphor to a blue LED, by coupling both red and green phosphors to a blue LED, or by coupling yellow, red and green phosphors to a blue LED.

The first reflector 200 and the second reflector 300 may be spaced apart from each other by a predetermined distance so as to face each other, such that an air guide is defined in an empty space between the first reflector 200 and the second reflector 300.

The first reflector 200 may have an open region, and may come into contact with one side of the light source module 100 or may be spaced apart from the light source module 100 by a predetermined distance.

More specifically, the first reflector 200 may have an open central region, and the light source module 100 may include a first light source module and a second light source module which are arranged at opposite edge regions of the first reflector 200 so as to face each other.

The first reflector 200 may be formed of any one of a reflective coating film and a reflective coating material layer and may serve to reflect light emitted from the light source module 100 toward the second reflector 300.

A saw-toothed reflective pattern may be formed on a surface of the first reflector 200 facing the light source module 100. The reflective pattern may be flat or may be curved.

The reason for providing the surface of the first reflector 200 with the reflective pattern is to reflect light emitted from the light source module 100 toward the central region of the second reflector 300, thereby increasing luminance of the central region of the illumination unit.

The second reflector 300 may include a bottom plate 310 and lateral plates 320.

The lateral plates 320 may include a pair of first lateral plates 320a, which are arranged to face each other in a first direction (Y-direction of FIG. 2) of the bottom plate 310, and a pair of second lateral plates 320b which are arranged to face each other in a second direction (X-direction of FIG. 2) orthogonal to the first direction.

The light source module 100 and the first reflector 200 may be placed over the first lateral plate 320a.

The second lateral plate 320b may have a groove.

More specifically, the groove 110 may be formed in an upper surface 320b2 of the second lateral plate 320b and serve as a passage of a line that electrically connects the connector 100c of the light source module 100 and a drive unit to each other.

Here, at least one hole may be perforated in the groove 110.

As such, the drive unit to drive the light source module 100 may be located below the bottom plate 310 of the second reflector 300, and at least one line may pass through the groove 110 and the hole so as to electrically connect the light source module 100 and the drive unit to each other.

Through the aforementioned line connection, the groove 110 may be located close to the connector 100c of the light source module 100.

The second lateral plate 320b may have more than one first coupling portion 322 for coupling with an optical member and more than one second coupling portion 334 for coupling with a cover member.

The first coupling portion 322 may be formed on the upper surface 320b2 of the second lateral plate 320b, and the second coupling portion 334 may be formed on an outer surface 320b3 of the second lateral plate 320b.

In this case, the first coupling portion 322 and the second coupling portion 334 may be provided to correspond to each other in a one to one ratio.

The first coupling portion 322 may protrude upward (in Z-direction of FIG. 2) from the upper surface 320b2 of the second lateral plate 320b. The second coupling portion 334 may protrude in the second direction (X-direction of FIG. 2) from the outer surface 320b3 of the second lateral plate 320b.

A reflective coating film or a deposited reflective coating material layer may be formed over an inner surface 320b1 of the second lateral plate 320b and the bottom plate 310.

Although the same reflective material may be formed over the inner surface 320b1 of the second lateral plate 320b and the bottom plate 310, different materials may be formed as occasion demands.

The bottom plate 310 of the second reflector 300 may be spaced apart from the light source module 100 by a predetermined distance and may have an inclined surface having a predetermined inclination angle with respect to a horizontal plane that is parallel to the surface of the first reflector 200.

The inclined surface of the bottom plate 310 of the second reflector 300 may serve to reflect the light, emitted from the light source module 100 or reflected from the first reflector 200, toward the open region of the first reflector 200.

The bottom plate 310 of the second reflector 300 may include at least two inclined surfaces having at least one inflection point.

In the bottom plate 310 of the second reflector 300, the first and second inclined surfaces, which are located next to each other about the inflection point, may have different radii of curvature.

The inflection point between the first and second inclined surfaces may be located close to the light source module 100.

This is because the radius of curvature of the first inclined surface close to the light source module 100 is greater than the radius of curvature of the second inclined surface.

A reflective coating film or a deposited reflective coating material layer may be formed over an upper surface of the bottom plate 310 of the second reflector 300.

Accordingly, the bottom plate 310 of the second reflector 300 may include at least one of a metal or metal oxide. For example, the bottom plate 310 may be formed of a metal or metal oxide having high reflectivity, such as aluminum (Al), silver (Ag), gold (Au) or titanium dioxide (TiO2).

In this case, the bottom plate 310 of the second reflector 300 may be formed by depositing or coating a metal or metal oxide on the upper surface thereof, or may be formed by printing metallic ink.

Here, deposition may be performed by thermal deposition, evaporation, or vacuum deposition such as sputtering, and coating or printing may be performed by gravure coating, silk screen printing, or the like.

As occasion demands, the second reflector 300 may be provided with at least one of a specular-reflection sheet and a diffuse-reflection sheet.

In the bottom plate 310 of the second reflector 300, the first and second inclined surfaces may be formed of the same material or different materials and may have different surface roughness values.

More specifically, in the bottom plate 310 of the second reflector 300, the first and second inclined surfaces may be formed of the same material, but may have different surface roughness values.

Alternatively, in the bottom plate 310 of the second reflector 300, the first and second inclined surfaces may be formed of different materials and may have different surface roughness values.

Figure 2:
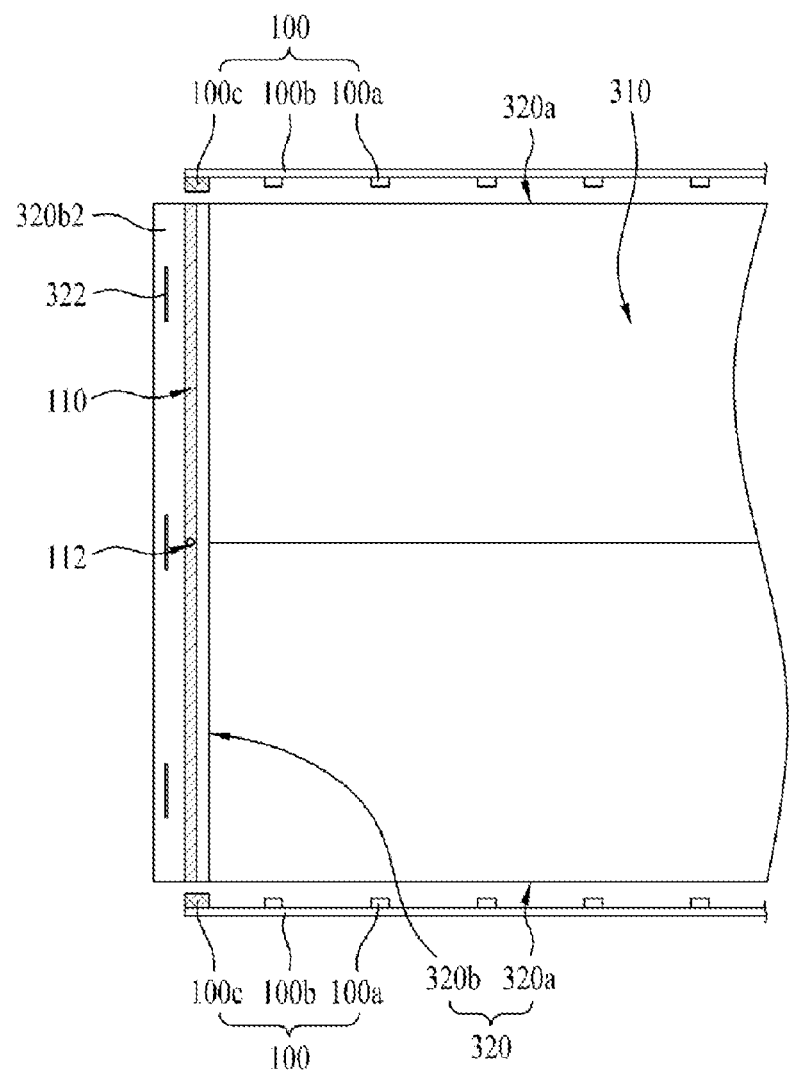
FIG. 2 is a view illustrating a position of a groove according to a first embodiment.

FIG. 2 is a view illustrating a position of the groove according to a first embodiment.

As illustrated in FIG. 2, the second reflector 300 may include the bottom plate 310 and the lateral plates 320.

The lateral plates 320 may include the first lateral plates 320a, which are arranged to face each other in the first direction (Y-direction of FIG. 2) of the bottom plate 310, and the second lateral plates 320b which are arranged to face each other in the second direction (X-direction of FIG. 2) orthogonal to the first direction.

The light source module 100 and the first reflector 200 may be placed over the first lateral plate 320a.

The light source module 100 may include the board 100b having an electrode pattern, the at least one light source 100a placed on the board 100b, and the at least one connector 100c for electric connection with an external component.

The second lateral plate 320b may include the groove 110.

More specifically, the groove 110 may be formed in the upper surface 320b2 of the second lateral plate 320b and serve as a passage of a line that electrically connects the connector 100c of the light source module 100 and the drive unit to each other.

The at least one hole 112 may be perforated in the groove 110.

As such, if the drive unit to drive the light source module 100 is located below the bottom plate 310 of the second reflector 300, a line electrically connected to the connector 100c of the light source module 100 may pass through the groove 110 and the hole 112 to thereby be electrically connected to the drive unit below the bottom plate 310.

The light source module 100 including the connector 100c may be placed on the first lateral plate 320a such that a portion of the connector 100c overlaps with the groove 110 of the second lateral plate 320b.

Figure 3A:
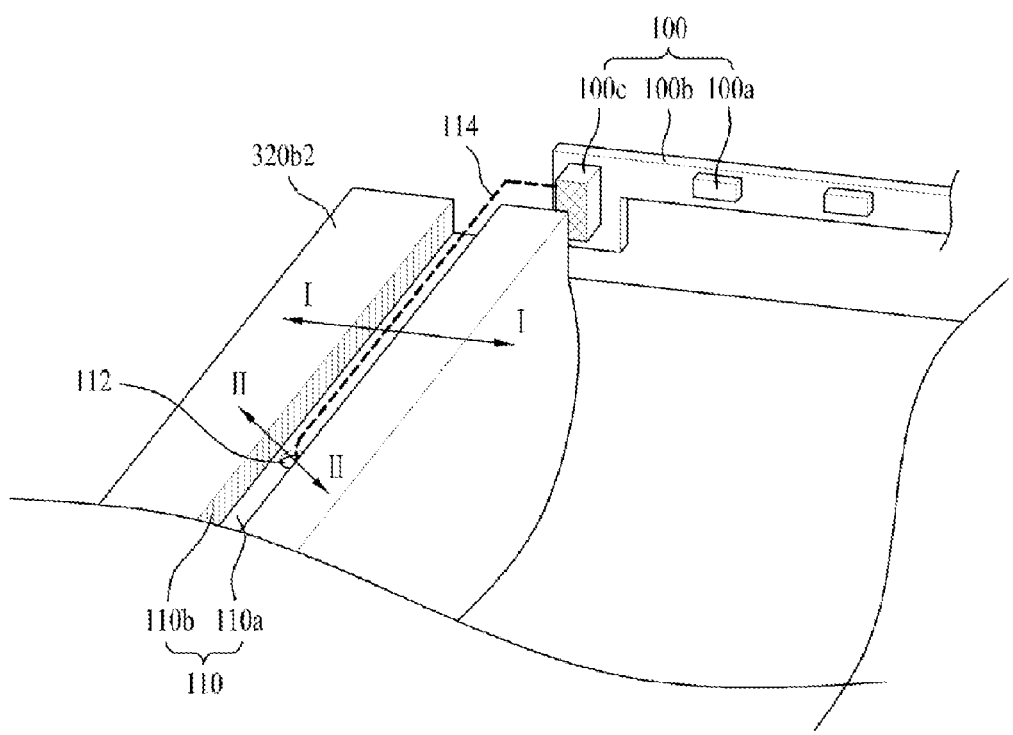
FIGS. 3A and 3B are views illustrating electric connection between a light source module and a drive unit according to the first embodiment.
Figure 3B:
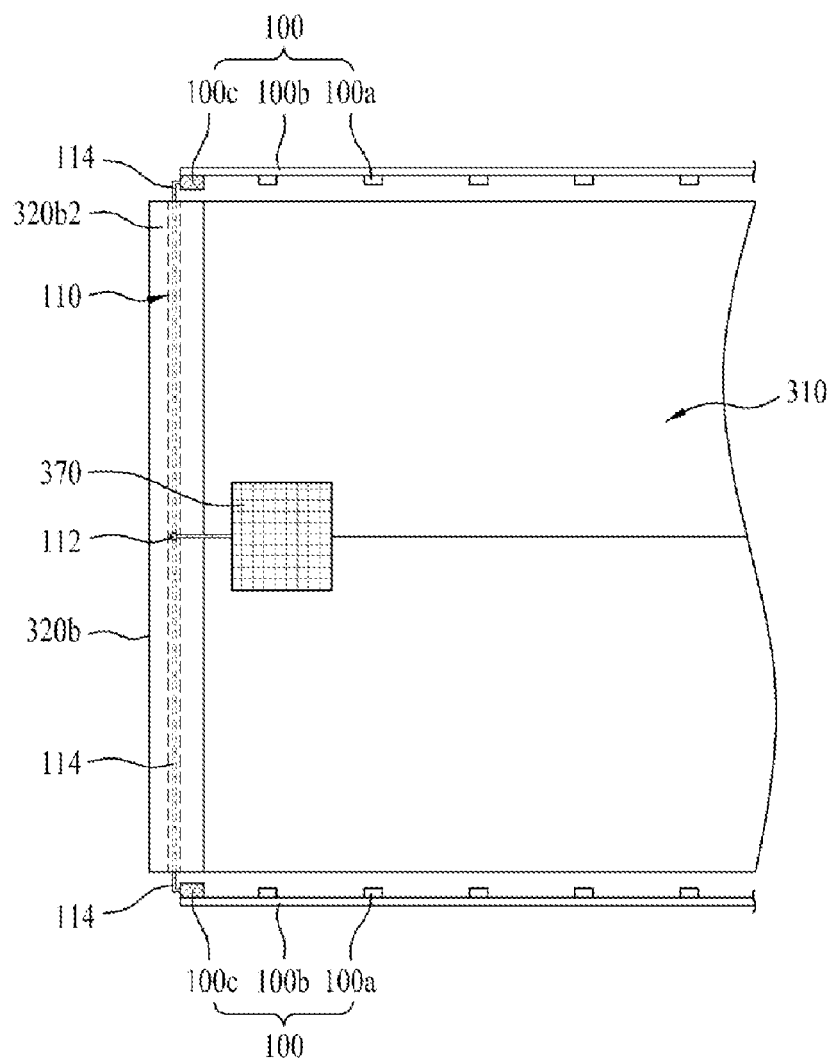

FIGS. 3A and 3B are views illustrating electric connection between the light source module and the drive unit according to the first embodiment. FIG. 3A illustrates the groove viewed from the top, and FIG. 3B illustrates the groove viewed from the bottom.

As illustrated in FIG. 3A, the light source module 100 may include the board 100b having the electrode pattern, the at least one light source 100a placed on the board 100b, and the at least one connector 100c for electric connection with an external component.

The groove 110 may be formed in the upper surface 320b2 of the second lateral plate 320b and serve as a passage of a line 114 that electrically connects the connector 100c of the light source module 100 and the drive unit to each other.

The at least one hole 112 may be perforated in the groove 110.

As illustrated in FIG. 3B, the drive unit 370 to drive the light source module 100 may be located below the bottom plate 310 of the second reflector 300, and the at least one line 114 may pass through the groove 110 and the hole 112 so as to electrically connect the light source module 100 and the drive unit 370 to each other.

As such, the groove 110 may be located close to the connector 100c of the light source module 100.

Figure 4:
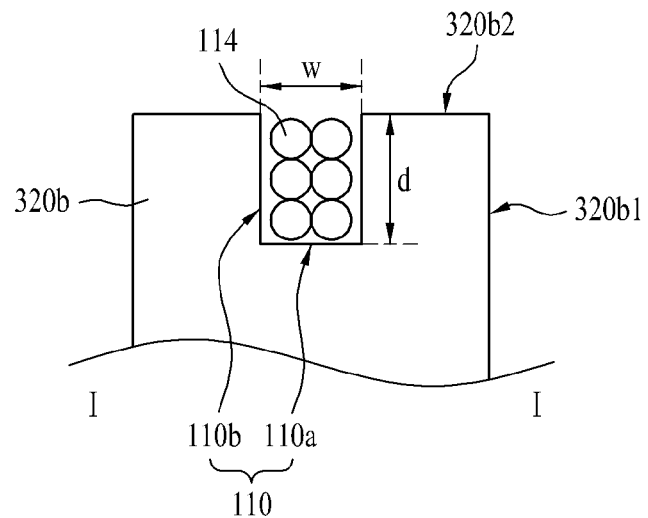
FIG. 4 is a sectional view taken along the line I-I of FIG. 3A.

FIG. 4 is a sectional view taken along the line I-I of FIG. 3A.

As illustrated in FIG. 4, the groove 110 may be formed in the upper surface 320b2 of the second lateral plate 320b and serve as a passage of the line 114 that electrically connects the connector 100c of the light source module 100 and the drive unit 370 to each other. The groove 110 may be defined by a bottom surface 110a and a lateral surface 110b.

The lateral surface 110b of the groove 110 may be a flat surface orthogonal to the bottom surface 110a.

As occasion demands, the lateral surface 110b of the groove 110 may be inclined with respect to the bottom surface 110a.

The groove 110 may have a width w and a depth d which differ from each other.

For example, the width w of the groove 110 may be less than the depth d of the groove 110.

As occasion demands, the groove may have a width w and a depth d that are equal to each other.

Although the single line 114 may be placed in the groove 110, a plurality of lines 114 may be stacked one above another in the groove 110.

Accordingly, the depth d of the groove 110 may be determined based on the number of the lines 114.

Figure 5A:
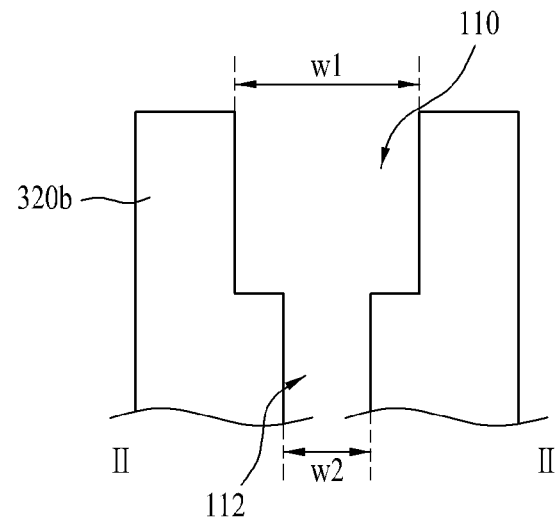
FIGS. 5A and 5B are sectional views taken along the line II-II of FIG. 3A.
Figure 5B:
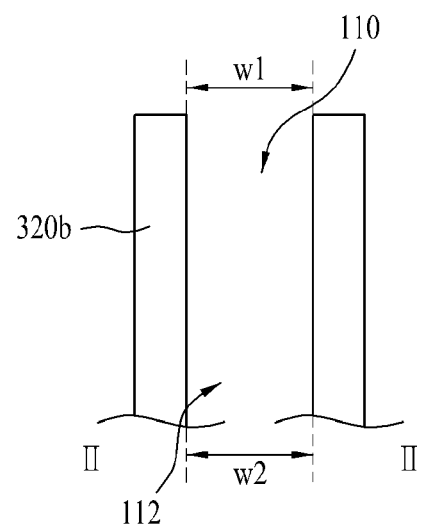

FIGS. 5A and 5B are sectional views taken along the line II-II of FIG. 3A.

As illustrated in FIGS. 5A and 5B, the second lateral plate 320b may have the groove 110 and the hole 112, which serve as a passage of the line that electrically connects the connector of the light source module and the drive unit to each other.

As illustrated in FIG. 5A, a width w1 of the groove 110 may differ from a width w2 of the hole 112.

For example, the width w1 of the groove 110 may be greater than the width w2 of the hole 112.

This is because a plurality of lines may be placed in the groove 110, but only some of the lines may pass through the hole 112.

Accordingly, the configuration of FIG. 5A is applicable to embodiments in which some of the plurality of lines placed in the groove 110 pass through the hole 112.

As occasion demands, as illustrated in FIG. 5B, the width w1 of the groove 110 may be equal to the width w2 of the hole 112.

As such, the width w1 of the groove 110 and the width w2 of the hole 112 may be determined based on various arrangements of the lines.

In another embodiment, a plurality of different holes 112 may be formed in the single groove 110.

FIGS. 6A to 6D are sectional views illustrating different shapes of the groove.

As illustrated in FIGS. 6A to 6D, the second lateral plate 320b has the groove 110 that serves as a passage of a line that electrically connects the connector 100c of the light source module and the drive unit to each other. The groove 110 may include first and second lateral surfaces 110b1 and 110b2 facing each other, and the bottom surface 110a located between the first and second lateral surfaces 110b1 and 110b2.

Figure 6A:
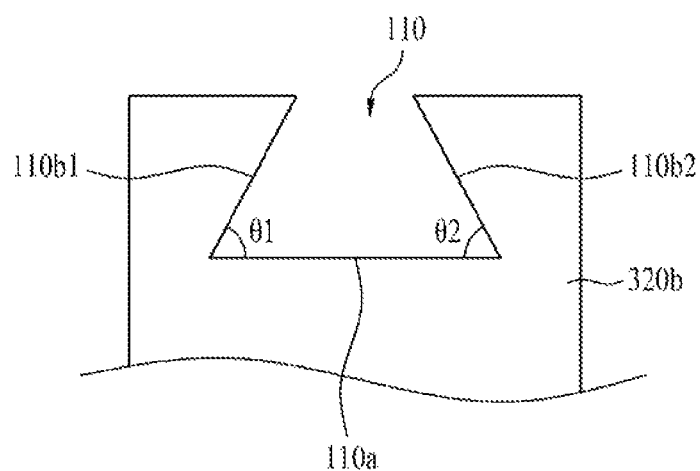
FIGS. 6A to 6D are sectional views illustrating different shapes of the groove.

As illustrated in FIG. 6A, a first angle θ1 between the first lateral surface 110b1 and the bottom surface 110a and a second angle θ2 between the second lateral surface 110b2 and the bottom surface 110a may be an acute angle.

In this case, the first angle θ1 and the second angle θ2 may differ from each other, but may be equal to each other as occasion demands.

Figure 6B:
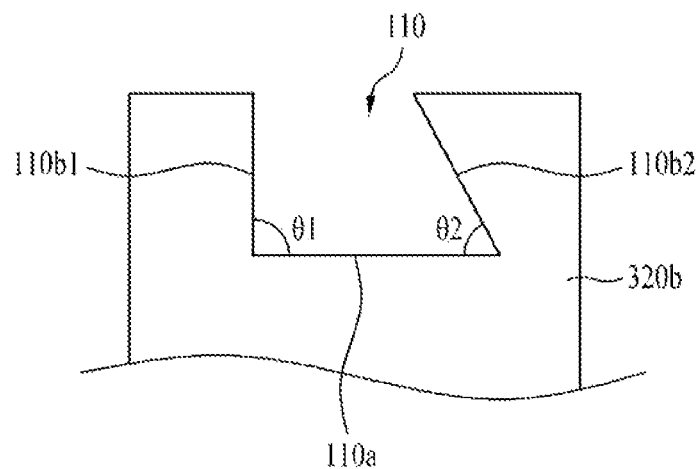
Figure 6C:
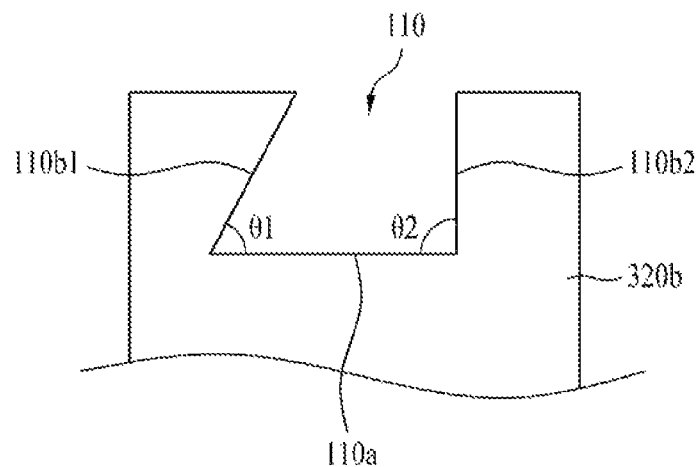

The first angle θ1 may be a right angle and the second angle θ2 may be an acute angle as illustrated in FIG. 6B, or the first angle θ1 may be an acute angle and the second angle θ2 may be a right angle as illustrated in FIG. 6C.

Figure 6D:
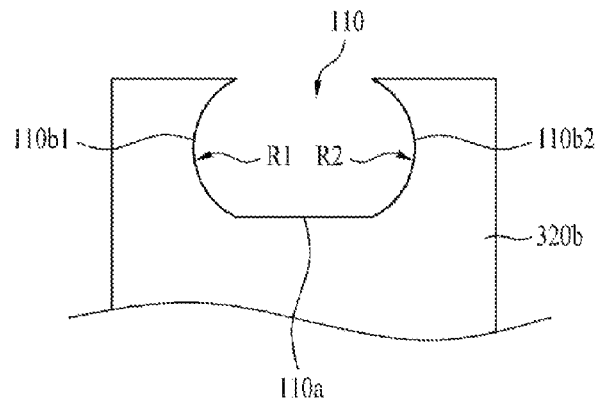

As occasion demands, as illustrated in FIG. 6D, the first lateral surface 110b1 may be a curved surface having a first radius of curvature R1, and the second lateral surface 110b2 may be a curved surface having a second radius of curvature R2.

The first radius of curvature R1 and the second radius of curvature R2 may differ from each other, but may be equal to each other, as occasion demands.

The reason for providing the groove 110 with a wider bottom end and a narrower top end is to prevent the line(s) placed in the groove 110 from being visible from the outside, thereby enabling fabrication of an illumination unit having a pleasant outer appearance and preventing damage to the line(s) due to external shock.

Figure 7:
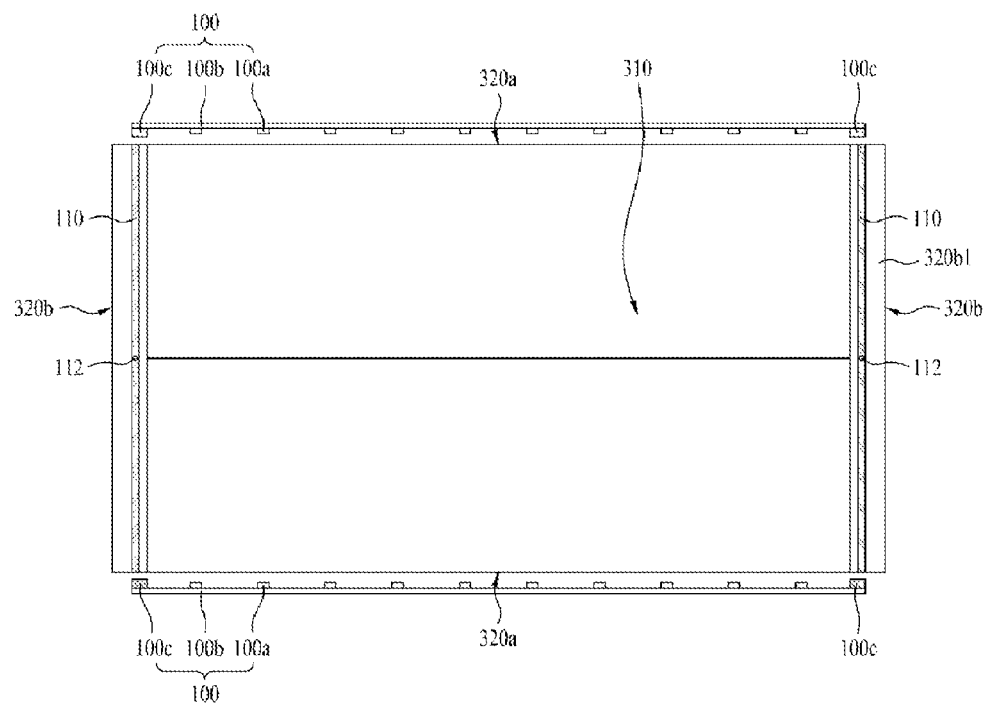
FIGS. 7 and 8 are views illustrating a position of the groove according to a second embodiment.
Figure 8:
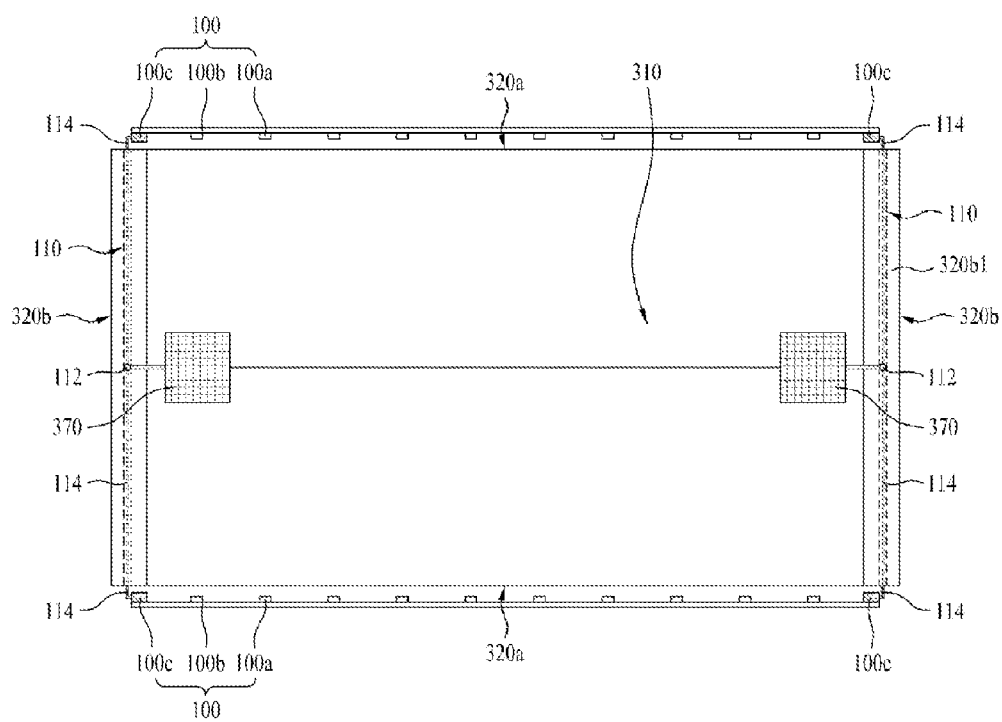

FIGS. 7 and 8 are views illustrating a position of the groove according to a second embodiment. FIG. 7 is a plan view illustrating the top of the groove, and FIG. 8 is a view illustrating the bottom of the groove.

Although FIG. 2 illustrates one embodiment of a position of the groove 110 in a configuration in which the connector 100c of the light source module 100 is located at one side of the board 100b, FIGS. 7 and 8 illustrate another embodiment of a position of the groove 110 in a configuration in which a pair of connectors 100c of the light source module 100 is arranged respectively at both sides of the board 100b.

As illustrated in FIGS. 7 and 8, the second reflector 300 may include the bottom plate 310 and the lateral plates 320.

The lateral plates 320 may include the first lateral plates 320a, which are arranged to face each other in the first direction (Y-direction of FIG. 2) of the bottom plate 310, and the second lateral plates 320b which are arranged to face each other in the second direction (X-direction of FIG. 2) orthogonal to the first direction.

The light source module 100 may be placed on the first lateral plate 320a.

The light source module 100 may include the board 100b having the electrode pattern, the at least one light source 100a placed on the board 100b, and the at least one connector 100c for electric connection with an external component.

In this case, the connectors 100c of the light source module 100 may be located respectively at both sides of the board 100b.

The second lateral plate 320b may have the groove 110 formed in the upper surface 320b2 thereof, and the groove 110 serves as a passage of a line that electrically connects a corresponding one of the connectors 100c of the light source module 100 and the drive unit to each other.

The at least one hole 112 may be perforated in the groove 110.

As illustrated in FIG. 8, the drive unit 370 to drive the light source module 100 may be located below the bottom plate 310 of the second reflector 300, and the at least one line 114 may pass through the groove 110 and the hole 112 so as to electrically connect the light source module 100 and the drive unit 370 to each other.

As such, the groove 110 may be located close to the corresponding connector 100c of the light source module 100.

In the aforementioned configuration in which the connectors 100c of the light source module 100 are located at both sides of the board 100b, the groove 110 may be formed in each of the second lateral plates 320b arranged to face each other.

Figure 9:
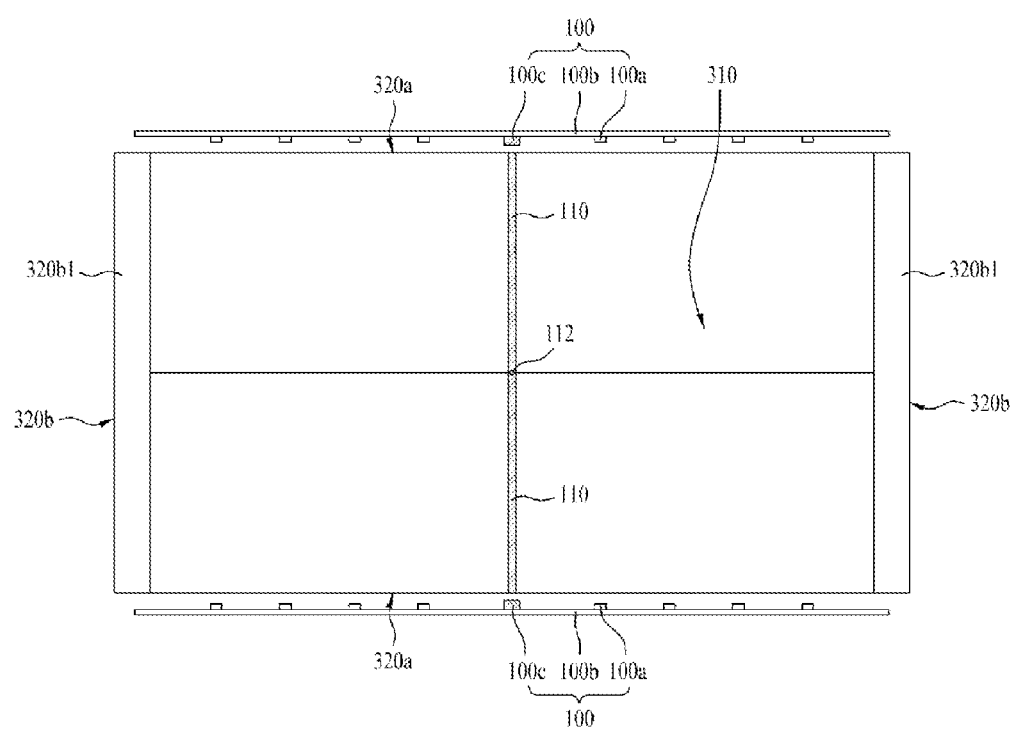
FIGS. 9 and 10 are views illustrating positions of recesses according to a third embodiment.
Figure 10:
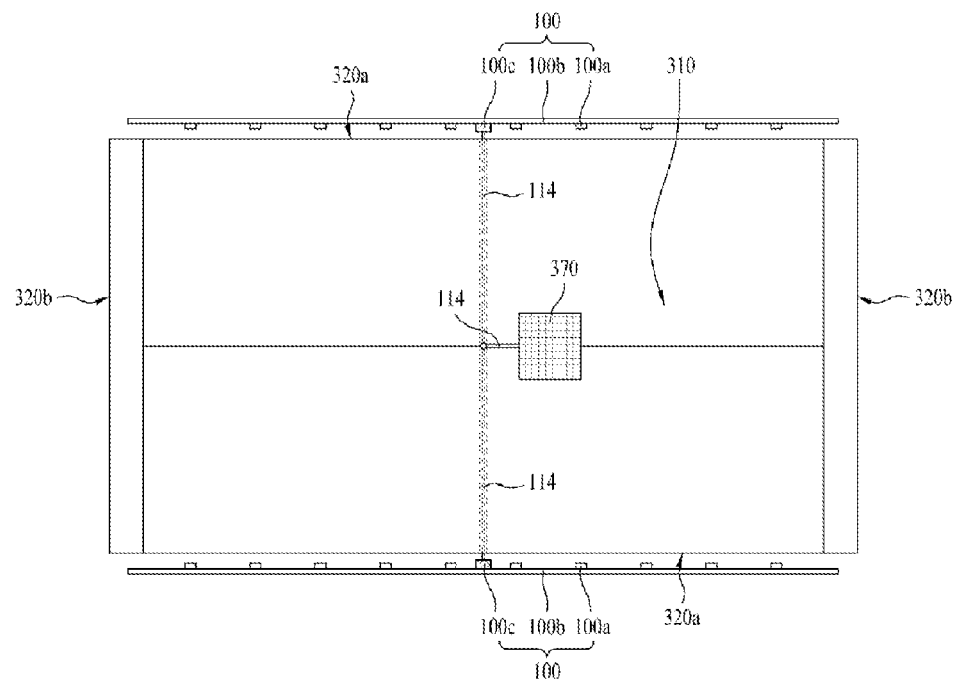

FIGS. 9 and 10 are views illustrating a position of the groove according to a third embodiment. FIG. 9 is a plan view illustrating the top of the groove, and FIG. 10 is a view illustrating the bottom of the groove.

FIG. 2 illustrates one embodiment of a position of the groove 110 in a configuration in which the connector 100c of the light source module 100 is located at one side of the board 100b, FIGS. 7 and 8 illustrate another embodiment of a position of the groove 110 in a configuration in which a pair of connectors 100c of the light source module 100 is arranged respectively at both sides of the board 100b, and FIGS. 9 and 10 illustrate the other embodiment of a position of the groove 110 in a configuration in which the connector 100c of the light source module 100 is located at the center of the board 100b.

As illustrated in FIGS. 9 and 10, the second reflector 300 may include the bottom plate 310 and the lateral plates 320.

The lateral plates 320 may include the first lateral plates 320a, which are arranged to face each other in the first direction (Y-direction of FIG. 2) of the bottom plate 310, and the second lateral plates 320b which are arranged to face each other in the second direction (X-direction of FIG. 2) orthogonal to the first direction.

The light source module 100 may be placed on the first lateral plate 320a.

The light source module 100 may include the board 100b having the electrode pattern, the at least one light source 100a placed on the board 100b, and the at least one connector 100c for electric connection with an external component.

In this case, the connector 100c of the light source module 100 may be located at the center of the board 100b.

The bottom plate 310 located close to the connector 100c of the light source module 100 may have the groove 110 that serves as a passage of a line that electrically connects the connector 100c of the light source module 100 and the drive unit to each other.

The at least one hole 112 may be perforated in the groove 110.

As illustrated in FIG. 10, the drive unit 370 to drive the light source module 100 may be located below the bottom plate 310 of the second reflector 300, and the at least one line 114 may pass through the groove 110 and the hole 112 so as to electrically connect the light source module 100 and the drive unit 370 to each other.

As such, the groove 110 may be located close to the connector 100c of the light source module 100.

In the aforementioned configuration in which the connector 100c of the light source module 100 is located at the center of the board 100b, the groove 110 may be formed in the bottom plate 310.

Figure 11:
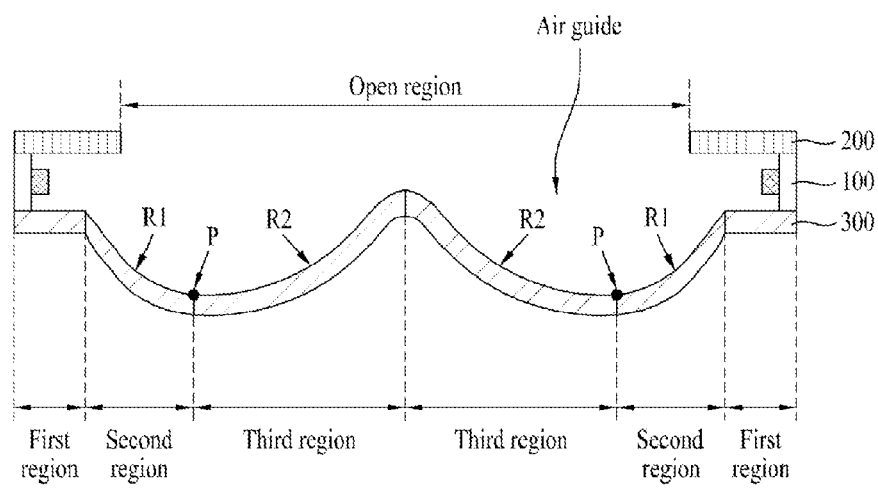
FIG. 11 is a view illustrating an inclined surface of a second reflector according to a first embodiment.

FIG. 11 is a view illustrating an inclined surface of the second reflector according to a first embodiment.

As illustrated in FIG. 11, the light source module 100 is located between the first and second reflectors 200 and 300. The second reflector 300 may include at least one inclined surface and at least one flat surface. The flat surface of the second reflector 300 may be located close to the light source module 100 and may be parallel to the first reflector 200.

The inclined surface of the second reflector 300 may include at least one inflection point. That is, inclined surfaces, which are located next to each other about the inflection point, may have different radii of curvature.

For example, the second reflector 300 may include first, second, and third regions.

The first region may be aligned with the light source module 100 and the first reflector 200, and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface of the second region and the second inclined surface of the third region may be located next to each other about an inflection point P.

In this case, the first inclined surface of the second region may be a curved surface having a first radius of curvature R1, and the second inclined surface of the third region may be a curved surface having a second radius of curvature R2.

The first radius of curvature R1 and the second radius of curvature R2 may differ from each other, and the first radius of curvature R1 may be greater than the second radius of curvature R2.

As occasion demands, the first radius of curvature R1 and the second radius of curvature R2 may be equal to each other.

At least one of the first inclined surface of the second region and the second inclined surface of the third region may be a convexly curved surface or a concavely curved surface.

As occasion demands, the first inclined surface of the second region may be a flat surface having a first gradient and the second inclined surface of the third region may be a flat surface having a second gradient.

In this case, the first gradient and the second gradient may differ from each other, and the first gradient may be greater than the second gradient.

The first region of the second reflector 300 may be provided with a specular-reflection sheet. The second region and the third region of the second reflector 300 may be provided with at least one of a specular-reflection sheet and a diffuse-reflection sheet.

The specular-reflection sheet formed on the first region of the second reflector 300 serves to reflect light to a low luminance central region of the second reflector 300, which achieves uniform luminance.

Additionally, since the first region of the second reflector 300 is the flat surface parallel to the first reflector 200, concentrating a greater quantity of light emitted from the light source module 100 on the low-luminance central region of the second reflector 300 may increase luminance at a central region of the illumination unit.

The second reflector 300 may be formed of a metal or metal oxide having high reflectivity, such as aluminum (Al), silver (Ag), gold (Au) or titanium dioxide (TiO2). The first, second and third regions of the second reflector 300 may be formed of the same material or different materials, and may have different surface roughness values.

More specifically, the first, second and third regions of the second reflector 300 may be formed of the same material, but may have different surface roughness values.

Alternatively, the first, second and third regions of the second reflector 300 may be formed of different materials and may have different surface roughness values.

Figure 12A:
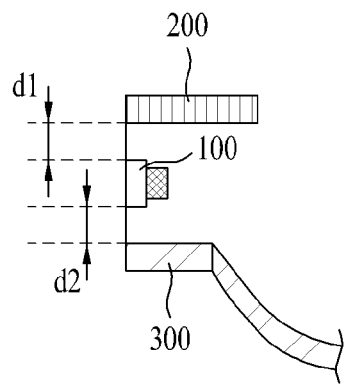
FIGS. 12A to 12C are explanatory views illustrating an arrangement relationship between a light source module and first and second reflectors.
Figure 12B:
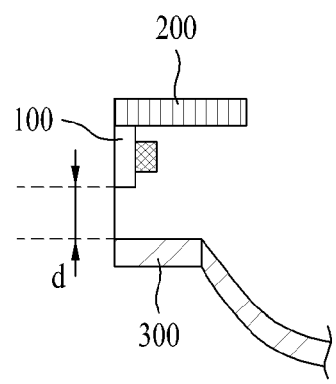
Figure 12C:
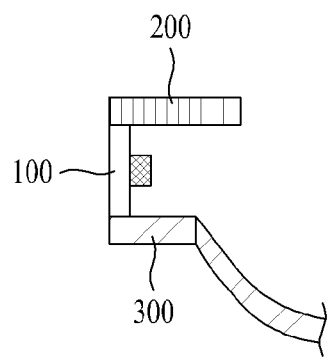

FIGS. 12A to 12C are explanatory views illustrating an arrangement relationship between the light source module and the first and second reflectors.

FIG. 12A illustrates the light source module 100 spaced apart from the first reflector 200 and the second reflector 300 by predetermined distances. FIG. 12B illustrates the light source module 100 coming into contact with the first reflector 200 while being spaced apart from the second reflector 300 by a predetermined distance. FIG. 12C illustrates the light source module 100 coming into contact with both the first reflector 200 and the second reflector 300.

As illustrated in FIG. 12A, the light source module 100 may be spaced apart from the first reflector 200 by a first distance d1 and may be spaced apart from the second reflector 300 by a second distance d2.

Here, the first distance d1 and the second distance d2 may be equal to each other, or may differ from each other.

For example, the first distance d1 may be less than the second distance d2.

This is because a hot spot phenomenon may occur if the first distance d1 is greater than the second distance d2.

As illustrated in FIG. 12B, the light source module 100 may come into contact with the first reflector 200 and may be spaced apart from the second reflector 300 by a distance d.

When the light source module 100 comes into contact with the first reflector 200, it is possible to prevent a hot spot phenomenon and to transmit light more distantly from the light source module 100.

As illustrated in FIG. 12C, the light source module 100 may come into contact with both the first reflector 200 and the second reflector 300.

When the light source module 100 comes into contact with both the first reflector 200 and the second reflector 300, it is possible to prevent a hot spot phenomenon, to transmit light more distantly from the light source module 100, and to reduce a thickness of the entire illumination unit.

Figure 13A:
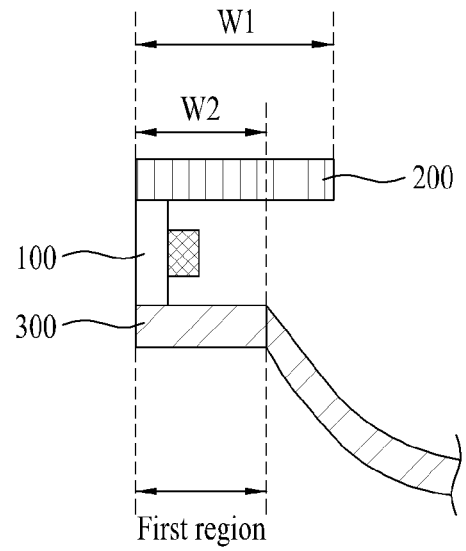
FIGS. 13A and 13B are views comparing a width of a first region of the second reflector with a width of the first reflector.
Figure 13B:
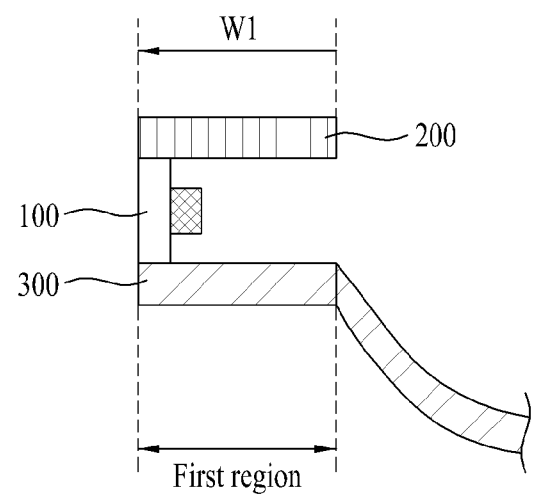

FIGS. 13A and 13B are views comparing a width of the first region of the second reflector with a width of the first reflector.

As illustrated in FIG. 13A, the first region of the second reflector 300 may overlap with the first reflector 200, and a width W2 of the first region of the second reflector 300 may be less than a width W1 of the first reflector 200.

Through this configuration, as light reflected from the first region of the second reflector 300 is repeatedly reflected from the first reflector 200, the light may be concentrated on the low luminance central region of the second reflector 300.

As illustrated in FIG. 13B, the first region of the second reflector 300 may completely overlap with the first reflector 200, and a width of the first region of the second reflector 300 may be equal to a width W1 of the first reflector 200.

FIGS. 14A to 14D are views illustrating different inclined surfaces for the second reflector.

Figure 14A:
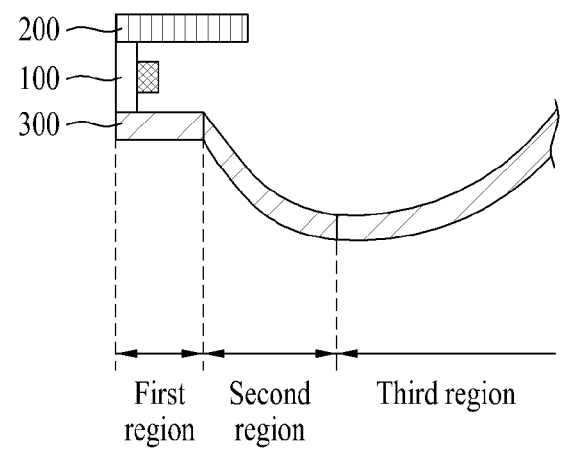
FIGS. 14A to 14D are views illustrating different inclined surfaces for the second reflector.

As illustrated in FIG. 14A, the second reflector 300 may include the first, second and third regions. The first region may be aligned with the light source module 100 and the first reflector 200 and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface may be a curved surface having a first radius of curvature, and the second inclined surface may be a curved surface having a second radius of curvature. The first radius of curvature and the second radius of curvature may differ from each other.

As occasion demands, at least one of the first and second inclined surfaces may be a convexly curved surface or a concavely curved surface.

Figure 14B:
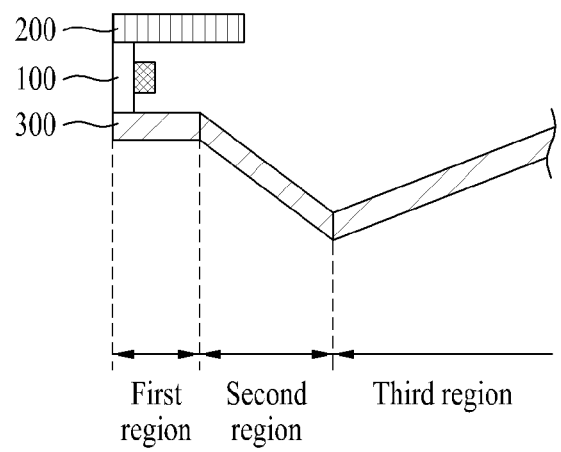

As illustrated in FIG. 14B, the second reflector 300 may include the first, second and third regions. The first region may be aligned with the light source module 100 and the first reflector 200 and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface may be a flat surface having a first gradient, and the second inclined surface may be a flat surface having a second gradient. The first gradient and the second gradient may differ from each other.

Figure 14C:
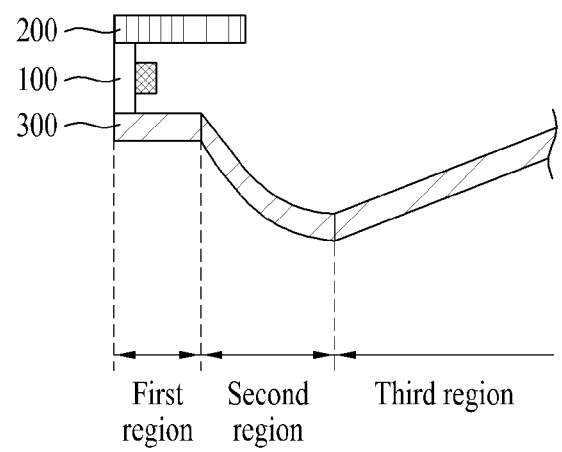

As illustrated in FIG. 14C, the second reflector 300 may include the first, second and third regions. The first region may be aligned with the light source module 100 and the first reflector 200 and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface may be a curved surface having a predetermined radius of curvature, and the second inclined surface may be a flat surface having a predetermined gradient.

Figure 14D:
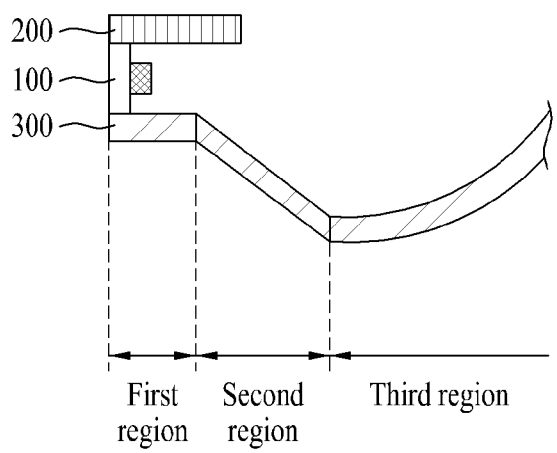

As illustrated in FIG. 14D, the second reflector 300 may include the first, second and third regions. The first region may be aligned with the light source module 100 and the first reflector 200 and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface may be a flat surface having a predetermined gradient, and the second inclined surface may be a curved surface having a predetermined radius of curvature.

Figure 15:
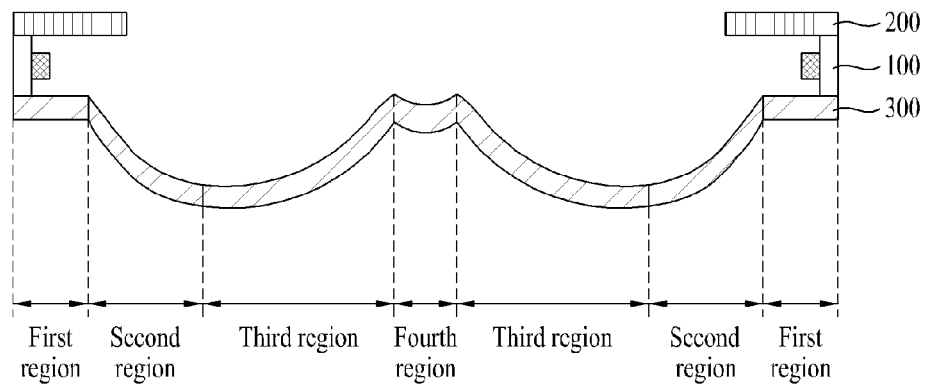
FIG. 15 is a view illustrating an inclined surface of a second reflector according to a second embodiment.

FIG. 15 is a view illustrating an inclined surface of the second reflector according to a second embodiment.

Although FIG. 15 illustrates a configuration similar to that of FIG. 11, there is a difference in that a fourth region may be formed next to the third region of the second reflector 300.

As illustrated in FIG. 15, the second reflector 300 may include a center fourth region next to the third region.

The fourth region may be a flat surface parallel to the first reflector 200, or may be a curved surface having a third radius of curvature.

The fourth region is located at the center of the second reflector 300. The fourth region may have a gentle shape to provide uniform luminance because a sharp shape of the fourth region causes a hot spot phenomenon due to light concentration.

Figure 16A:
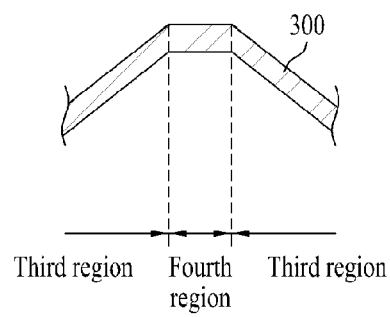
FIGS. 16A to 16C are views illustrating a fourth region of FIG. 15.
Figure 16B:
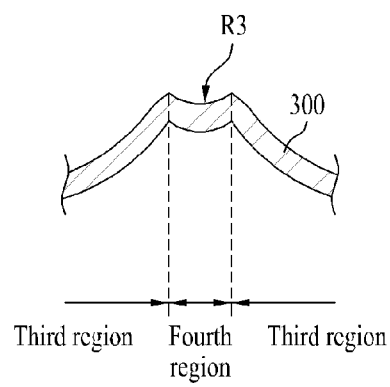
Figure 16C:
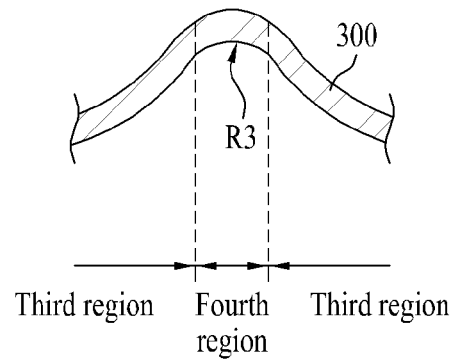

FIGS. 16A to 16C are views illustrating the fourth region of FIG. 15.

As illustrated in FIG. 16A, the fourth region of the second reflector 300 may be a flat surface parallel to the first reflector.

As illustrated in FIG. 16B, the fourth region of the second reflector 300 may be a concavely curved surface having a third radius of curvature R3. As illustrated in FIG. 16C, the fourth region of the second reflector 300 may be a convexly curved surface having a third radius of curvature R3.

As such, fabricating the fourth region with a gentle shape without a pointed portion may reduce a hot spot phenomenon and achieve uniform luminance.

The light source module 100 and the first and second reflectors 200 and 300 arranged as described above may be supported by a cover frame.

Figure 17A:
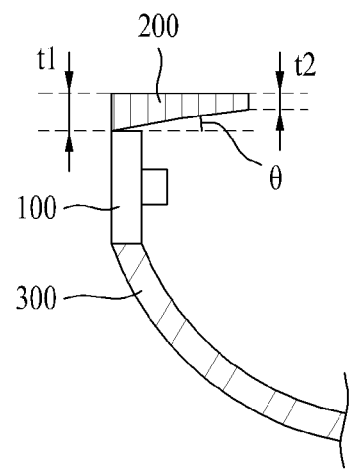
FIGS. 17A to 17D are views illustrating a first reflector having an inclined surface.
Figure 17B:
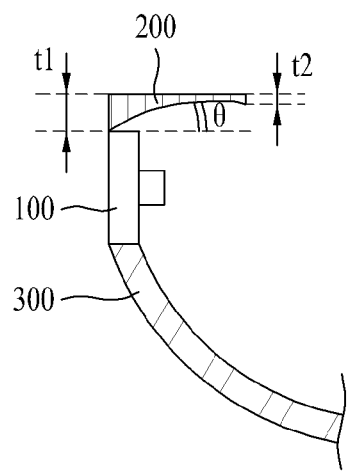
Figure 17C:
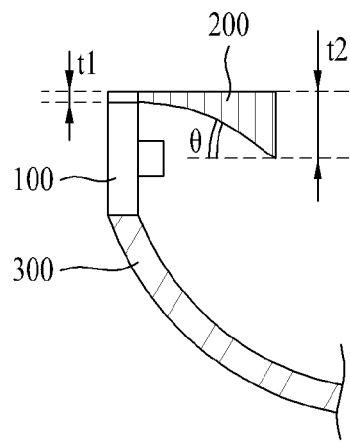
Figure 17D:
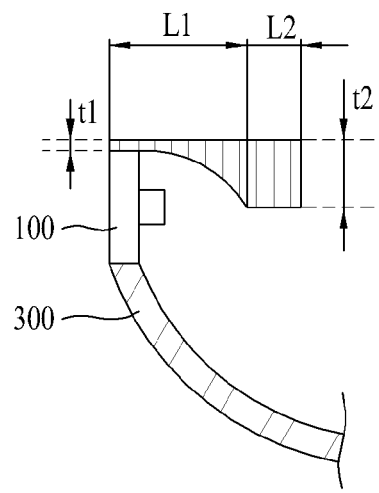

FIGS. 17A to 17D are views illustrating the first reflector having an inclined surface. FIG. 17A illustrates a flat inclined surface, and FIGS. 17B, 17C and 17D illustrate a curved inclined surface.

As illustrated in FIGS. 17A to 17D, one surface of the first reflector 200 facing the second reflector 300 may be inclined with respect to the other surface of the first reflector 200 by a predetermined angle.

Here, the angle θ of the inclined surface may be in a range of 1~85 degrees with respect to a horizontal plane parallel to the other surface of the first reflector 200.

A thickness of the first reflector 200 may gradually decrease or increase with increasing distance from the light source module 100.

More specifically, a thickness t1 of a region of the first reflector 200 close to the light source module 100 may differ from a thickness t2 of a region of the first reflector 200 distant from the light source module 100. As illustrated in FIGS. 17A and 17B, the thickness t1 of the region of the first reflector 200 close to the light source module 100 may be greater than the thickness t2 of the region of the first reflector 200 distant from the light source module 100.

As occasion demands, as illustrated in FIGS. 17C and 17D, the thickness t1 of the region of the first reflector 200 close to the light source module 100 may be less than the thickness t2 of the region of the first reflector 200 distant from the light source module 100.

Additionally, as illustrated in FIG. 17D, the first reflector 200 may include not only an inclined surface, but also a flat surface.

More specifically, the region of the first reflector 200 close to the light source module 100 may include an inclined surface, and the region of the first reflector 200 distant from the light source module 100 may include a flat surface.

Here, a length L1 of the inclined surface and a length L2 of the flat surface may be equal to each other, or may differ from each other, as occasion demands.

A reflective pattern may be formed on a surface of the first reflector 200.

FIGS. 18A to 18D are views illustrating the first reflector having a reflective pattern.

Figure 18A:
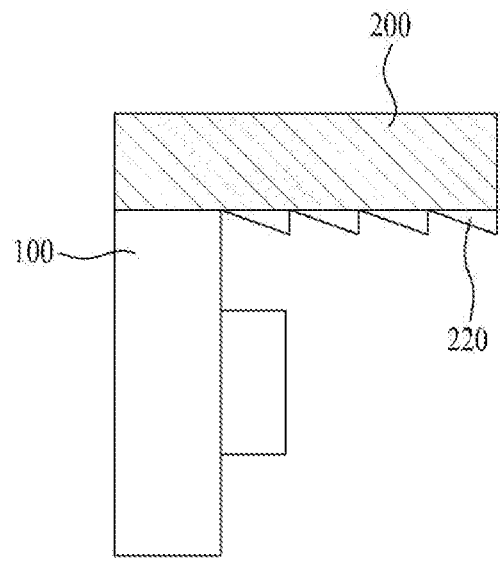
FIGS. 18A to 18D are views illustrating a first reflector having a reflective pattern.
Figure 18B:
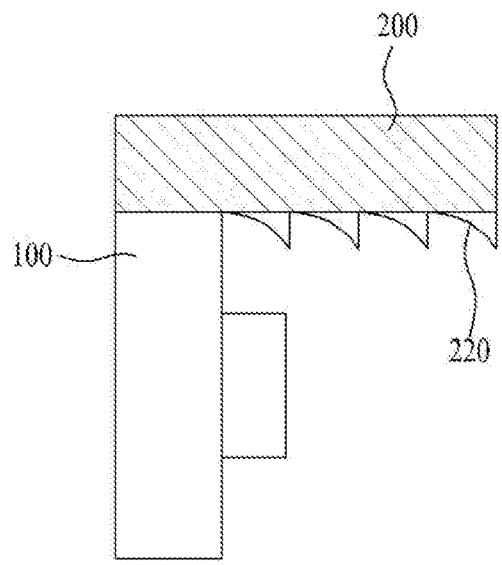
Figure 18C:
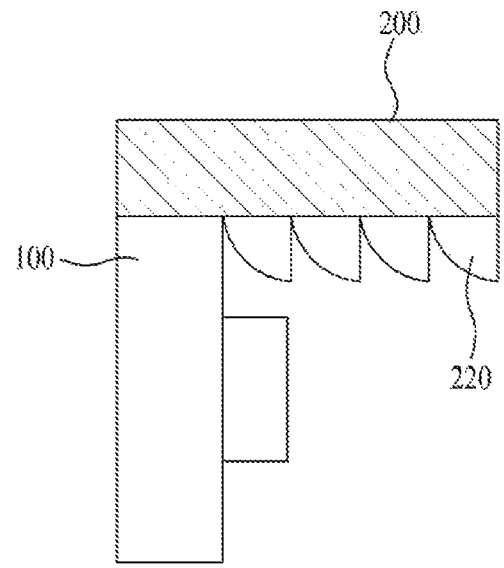

FIG. 18A illustrates a saw-toothed reflective pattern 220, each tooth of which may have a flat surface. FIGS. 18B and 18C illustrate a saw-toothed reflective pattern 220, each tooth of which may have a curved surface.

Here, the reflective pattern 220 illustrated in FIG. 18B has saw teeth of a concavely curved surface, whereas the reflective pattern 220 illustrated in FIG. 18C has saw teeth of a convexly curved surface.

Figure 18D:
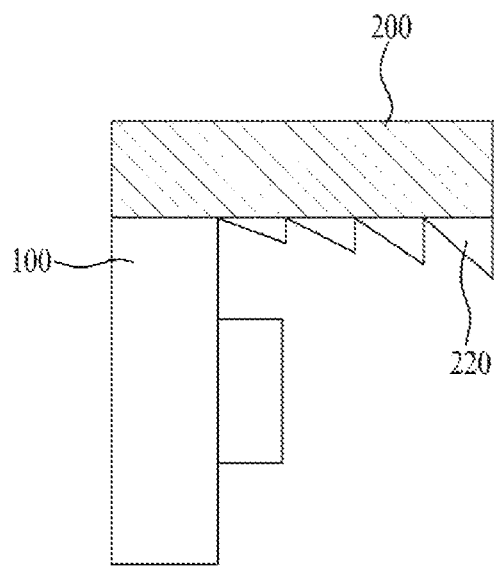

As occasion demands, as illustrated in FIG. 18D, in the case of the saw-toothed reflective pattern 220, the size of teeth may gradually increase with increasing distance from a fixed end of the first reflector 200.

Providing the reflective pattern 220 on the first reflector 200 may achieve higher reflectivity and uniform diffusion of light.

Accordingly, various sizes of the reflective pattern 220 may be formed at a corresponding region based on luminance distribution of the entire illumination unit.

Figure 19:
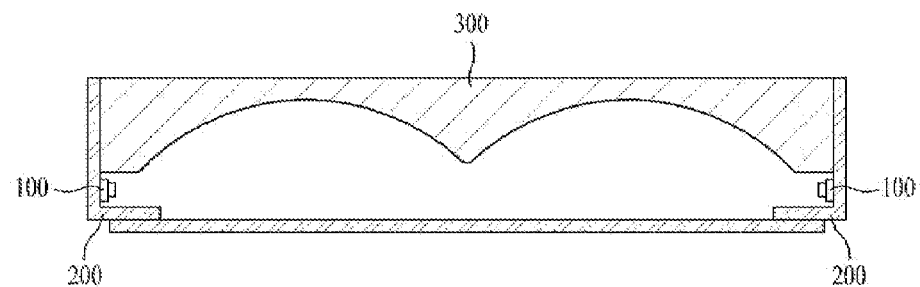
FIG. 19 is a sectional view illustrating an illumination unit including an optical member.
Figure 20:
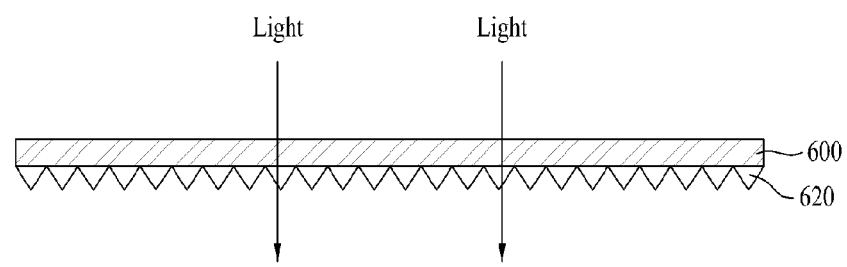
FIG. 20 is a sectional view illustrating the optical member of FIG. 19.

FIG. 19 is a sectional view illustrating an illumination unit including an optical member, and FIG. 20 is a sectional view illustrating the optical member of FIG. 19.

As illustrated in FIG. 19, an optical member 600 may be spaced apart from the second reflector 300 by a predetermined distance.

As such, an air guide may be defined in a space between the second reflector 300 and the optical member 600.

The optical member 600, as illustrated in FIG. 20, may have a roughened pattern 620 formed on an upper surface thereof.

The optical member 600 serves to diffuse light emitted from the light source module 100. To increase diffusion effects, the roughened pattern 620 may be formed on the upper surface of the optical member 600.

More specifically, the optical member 600 may have a multilayer form. The roughened pattern 620 may be an uppermost layer or any one layer of the optical member 600.

The roughened pattern 620 may have a stripe shape extending along the light source module 100.

In this case, the roughened pattern 620 may include ridges formed on the surface of the optical member 600. The respective ridges may have a first face and a second face facing each other, and an angle between the first face and the second face may be an acute angle or an obtuse angle.

As occasion demands, the optical member 600 may be formed of at least one sheet. More specifically, the optical member 600 may selectively include a diffusion sheet, a prism sheet, a luminance-increasing sheet, or the like.

The diffusion sheet functions to diffuse light emitted from a light source, the prism sheet functions to guide diffused light to a light emitting region, and the luminance-increasing sheet functions to increase luminance.

The second reflector 300 may include at least one of a metal or a metal oxide. For example, the second reflector 300 may be formed of a metal or metal oxide having high reflectivity, such as aluminum (Al), silver (Ag), gold (Au) or titanium dioxide (TiO2).

The second reflector 300 may be formed of any one of a reflective coating film and a reflective coating material layer. The second reflector 300 may serve to reflect light emitted from the light source module 100 toward the optical member 600.

A saw-toothed reflective pattern may be formed on a surface of the second reflector 300 facing the optical member 600. The reflective pattern may be flat or may be curved.

The reason for providing the surface of the second reflector 300 with the reflective pattern is to uniformly diffuse and reflect light emitted from the light source module 100.

As such, through provision of the groove and the reflector having a partial inclined surface for an air guide instead of a light guide plate, the aforementioned embodiments may achieve low weight and manufacturing costs and uniform luminance.

Accordingly, the illumination unit may achieve enhanced reliability and economical efficiency and may be suitable for a wide indoor space.

In addition, a backlight unit, a display apparatus, an indicator apparatus, and an illumination system, which employ the groove, the first and second reflectors, and the light source module according to the aforementioned embodiments, may be realized. For example, an illumination system may include a lamp, and a street lamp.

Figure 21:
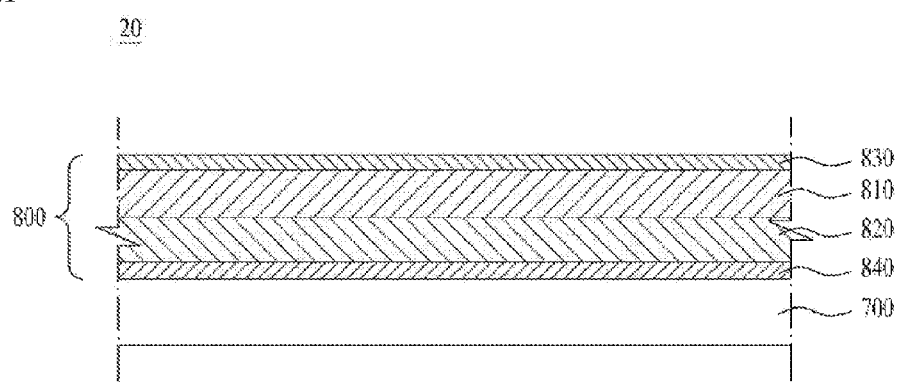
FIG. 21 is a view illustrating a display module having an illumination unit according to an embodiment.

FIG. 21 is a view illustrating a display module having an illumination unit according to an embodiment.

As illustrated in FIG. 20, the display module 20 may include a display panel 800 and an illumination unit 700.

The display panel 800 may include a color filter substrate 810 and a Thin Film Transistor (TFT) substrate 820, which are bonded to face each other with a uniform cell gap therebetween. A liquid crystal layer (not shown) may be interposed between the two substrates 810 and 820.

An upper polarizer 830 and a lower polarizer 840 may be disposed at upper and lower sides of the display panel 800. More specifically, the upper polarizer 830 may be disposed on an upper surface of the color filter substrate 810, and the lower polarizer 840 may be disposed beneath a lower surface of the TFT substrate 820.

Although not illustrated, a gate and data drive unit may be provided at a lateral surface of the display panel 800 and may generate a drive signal to drive the panel 800.

Figure 22:
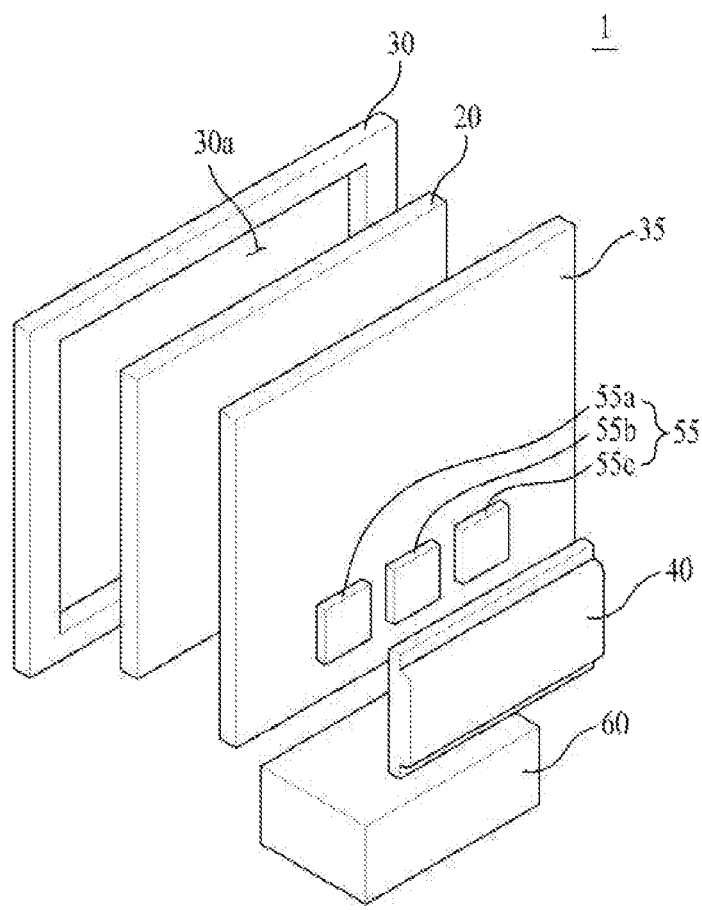
FIGS. 22 and 23 are views illustrating a display apparatus according to an embodiment.
Figure 23:
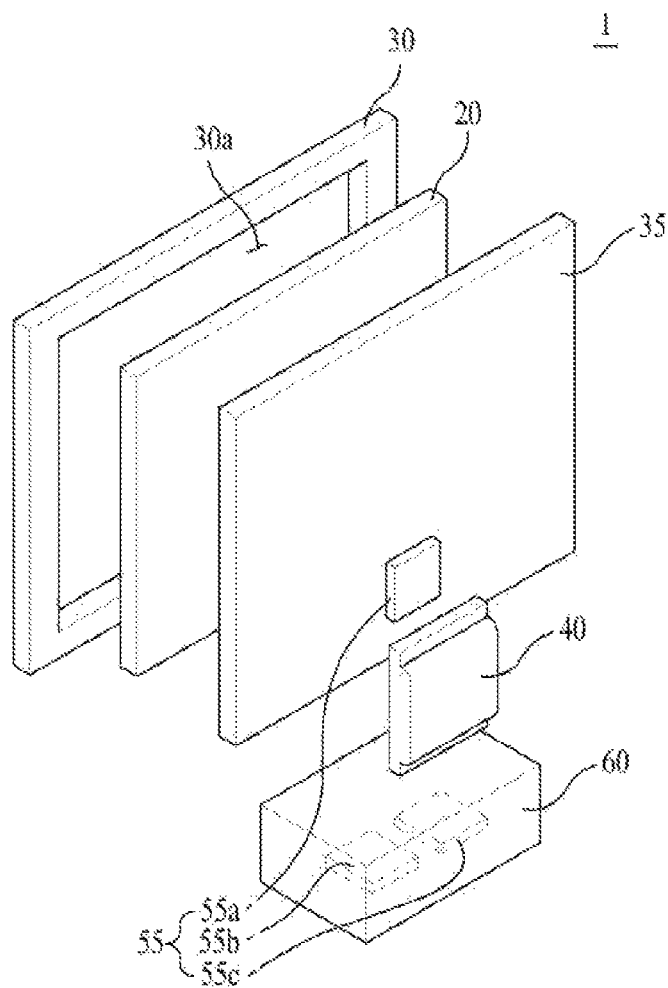

FIGS. 22 and 23 are views illustrating a display apparatus according to an embodiment.

Referring to FIG. 22, the display apparatus 1 may include the display module 20, a front cover 30 and a back cover 35 to surround the display module 20, a drive unit 55 provided at the back cover 35, and a drive unit cover 40 to surround the drive unit 55.

The front cover 30 may include a transparent front panel (not shown) to transmit light. The front panel serves to protect the display module 20 spaced apart therefrom by a predetermined distance and to transmit light emitted from the display module 20, allowing an image displayed on the display module 20 to be seen from the outside.

The back cover 35 may be coupled to the front cover 30 to protect the display module 20.

The drive unit 55 may be placed on a surface of the back cover 35.

The drive unit 55 may include a drive controller 55a, a main board 55b and a power supply board 55c.

The drive controller 55a may be a timing controller. The drive controller 55a serves to adjust an operation timing of each driver IC of the display module 20. The main board 55b may serve to transmit V-sync, H-sync and R, G and B resolution signals to the timing controller. The power supply board 55c supplies power to the display module 20.

The drive unit 55 may be attached to the back cover 35 and may be enclosed by the drive unit cover 40.

The back cover 35 has a plurality of holes, through which the display module 20 may be connected to the drive unit 55. Also, a stand 60 to support the display apparatus 1 may be provided.

In an alternative embodiment, as illustrated in FIG. 23, the drive controller 55a of the drive unit 55 may be provided at the back cover 35, whereas the main board 55b and the power supply board 55c may be provided in the stand 60.

The drive unit cover 40 may be configured to enclose only the drive unit 55 provided at the back cover 35.

Although the present embodiment illustrates the main board 55b and the power supply board 55c as being provided separately, they may be integrated with each other, and the disclosure is not limited thereto.

In other embodiments, a backlight unit, a display apparatus, an indicator apparatus, and an illumination system, which include the groove, the first and second reflectors and the light source module as described in the aforementioned embodiments, may be realized. For example, the illumination system may include a lamp or a street lamp.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illumination unit, comprising:
   first and second reflectors; and
   at least one light source module disposed between the first and second reflectors,
   wherein the second reflector includes:
      at least one inclined surface including at least one inflection point; and
      at least one first flat surface parallel to the first reflector,
      wherein the at least one light source module is closer to the at least one first flat surface than the at least one inclined surface.

2. The illumination unit according to claim 1, wherein the at least one inclined surface includes a plurality of inclined surfaces disposed next to each other about the at least one inflection point.

3. The illumination unit according to claim 2, wherein the inclined surfaces have different radii of curvature.

4. The illumination unit according to claim 2, wherein the second reflector comprises:
   a first region aligned with the at least one light source module and being the at least one first flat surface;
   a second region being a first inclined surface which is inclined downward from the first region; and
   a third region being a second inclined surface which is inclined upward from the second region, the inclined surfaces including the first and second inclined surface.

5. The illumination unit according to claim 4, wherein the first and second inclined surfaces are disposed next to each other about the at least one inflection point.

6. The illumination unit according to claim 4, wherein the second region is disposed between the first region and the third region, and
   wherein the third region is disposed next to the second region.

7. The illumination unit according to claim 4, wherein the first inclined surface is a curved surface having a first radius of curvature, and
   wherein the second inclined surface is a curved surface having a second radius of curvature.

8. The illumination unit according to claim 7, wherein the first radius of curvature is greater than the second radius of curvature.

9. The illumination unit according to claim 7, wherein the first radius of curvature and the second radius of curvature are equal to each other.

10. The illumination unit according to claim 4, wherein at least one of the first inclined surface or the second inclined surface is a convexly curved surface.

11. The illumination unit according to claim 4, wherein at least one of the first inclined surface or the second inclined surface is a concavely curved surface.

12. The illumination unit according to claim 4, wherein the first inclined surface is a second flat surface having a first gradient and the second inclined surface is a third flat surface having a second gradient.

13. The illumination unit according to claim 12, wherein the first gradient is greater than the second gradient.

14. The illumination unit according to claim 4, wherein the first region is provided with a specular-reflection sheet, and
wherein the second region and third region are provided with at least one of a specular-reflection sheet or a diffuse-reflection sheet.

15. The illumination unit according to claim 4, wherein the first, second, and third regions have different surface roughness values.

16. The illumination unit according to claim 4, wherein the at least one light source module is spaced apart from the first reflector by a first distance,
wherein the at least one light source module is spaced apart from the first region of the second reflector by a second distance, and
wherein the first distance is less than the second distance.

17. The illumination unit according to claim 4, wherein the at least one light source module contacts with both the first reflector and the first region of the second reflector.

18. The illumination unit according to claim 4, wherein the first region overlaps with the first reflector, and
wherein a width of the first region is less than a width of the first reflector.

19. The illumination unit according to claim 4, wherein the second reflector further comprises a fourth region disposed next to the third region and located at a center of the second reflector.

20. The illumination unit according to claim 19, wherein the fourth region has a gentle shape without a pointed portion.

* * * * *